United States Patent [19]

Wolf

[11] Patent Number: 5,090,465
[45] Date of Patent: Feb. 25, 1992

[54] DEVICE FOR REMOVING PROJECTING PARTS FROM TIRES AND THE LIKE

[75] Inventor: Erich Wolf, Pullach, Fed. Rep. of Germany

[73] Assignee: Linde Aktiengesellschaft, Wiesbaden, Fed. Rep. of Germany

[21] Appl. No.: 641,957

[22] Filed: Jan. 16, 1991

[30] Foreign Application Priority Data

Jan. 17, 1990 [DE] Fed. Rep. of Germany ....... 4001213

[51] Int. Cl.$^5$ ............................................. B29H 21/00
[52] U.S. Cl. ..................................... 157/13; 225/93.5; 425/806
[58] Field of Search ................... 157/13; 225/93, 93.5, 225/97; 425/806

[56] References Cited

U.S. PATENT DOCUMENTS 3,972,362 8/1976 Pace ....................................... 157/13
4,128,197 12/1978 Ischenko et al. ............... 225/935 X

FOREIGN PATENT DOCUMENTS 523807 10/1976 U.S.S.R. .............................. 425/806

Primary Examiner—James G. Smith
Attorney, Agent, or Firm—Millen, White & Zelano

[57] ABSTRACT

For removing projecting parts from tires by embrittlement of the tire and breaking the projecting parts, a breaking tool comprising a ribbed flexible strap suspended in a frame so as to conform to the profile of an embrittled tire supported therein removes projections with movement of the tire.

14 Claims, 1 Drawing Sheet

DEVICE FOR REMOVING PROJECTING PARTS FROM TIRES AND THE LIKE

BACKGROUND OF THE INVENTION

The invention relates to a device for removing projecting parts, such as burls, ridges and the like, from tires (trimming device) and similar workpieces by embrittlement and breaking of these parts. Tires of different sizes can be successively processed without any order, with a mounting frame or housing, which contains an embrittlement device, i.e., a cooling device and a breaking tool as well as devices which perform the isolating, gripping, conveying and processing movement of the tires in the housing.

Tires are produced by vulcanization of a corresponding initial material in molds. In this case, the excess initial material is driven out from the shaping mold in the production process and remains solidly connected to the tire product in the form of elongated burls extending from the surface of the tire. But these burls as well as other projecting parts and ridges from the production process must be removed for the final completion of the produced tire.

For this purpose, cutting off these burls with special cutting tools has been conventional, but the tool changing time, occurring with the wear of the cutting tools as well as imperfect processing because of inexact guiding of the cutting tools along the tire circumference cause problems.

A device based on the processing principle of cold embrittlement and breaking is known from DE-OS 31 50 901. According to this laid-open specification, the removal of the projecting parts and burls takes place by partial immersion of the tires in a coolant and the resulting embrittlement of these burls and ridges, which are then removed by special tools. The separation of the burls and ridges takes place according to the laid-open specification especially by pneumatically controlled rollers or stripping straps. Mainly the treads of the tires, as well as the areas laterally adjacent to them, can be processed with these breaking tools. In this case, these tools, on the one hand, have the drawback that they process the tires virtually only "in spots", on the point of contact of the tool and tread, and thus each point of the tire has to be coated several times for a satisfactory processing. A considerable processing time, which cannot be shortened, results from this. On the other hand, the adaptability of these tools, i.e., the roller and strap type tools, is limited by the combination of tire contour and width, since such tools can be designed for any width but not to match the contours of different tire sizes. As a result, processing defects often result on the side surfaces adjacent to the tread of the tires.

Therefore, in devices according to DE-OS 31 50 901, qualitative problems result such as problems in regard to short cycle times because of the processing periods that cannot be shortened. Further, devices of this type, when in continuous operation, require a back and forth movement of the coolant bath per tire to be processed, which presents an additional problem, especially with short cycle times, because of the so-called sloshing effects of the coolant.

But in general, processing based on the principle of embrittlement and breaking has proven to be perfectly favorable.

SUMMARY OF THE INVENTION

Therefore, the object of this invention is to provide an improved device, operating according to the principle of embrittlement and breaking and especially avoiding the above-mentioned drawbacks, for removing projecting parts from tires, and which is also suitable for short cycle times.

Another object is to provide a process based on this device.

Upon further study of the specification and appended claims, further objects and advantages of this invention will become apparent to those skilled in the art.

These objects are achieved with a device, which as a breaking tool, has a ribbed flexible strap comprising connected individual members or of a wire mesh or the like, such as, for example, a wire mesh belt known from conveyor technology, which is suspended in a mounting frame or housing so that the cold-embrittled tires with treads can be led up to the strap and positioned thereon. The strap rests on the respective tire profile and, because of the processing movement, preferably a rotation of the tire, the projecting parts are broken off. With the use of a ribbed, flexible strap as a breaking tool, all surfaces of a tire-like workpiece to be processed, especially the side surface parts adjacent to the tread, are acted on by abrasive pressure, and the mesh-like or jointlike design of the strap simply causes the breaking of the projecting parts. Especially suitable straps according to the invention have a mesh size between 5 and 30 mm and possibly have a one-dimensional rigidity crosswise to the strap's longitudinal direction.

The embrittlement of the tires takes place according to the invention by deep cooling, which is supplied by low-temperature media, especially liquified gases, e.g., liquid nitrogen. In this case, it is possible to transmit the cold to the workpiece in different ways. This can take place, e.g., by spraying the tires with liquified gases or by producing a very cold ambient atmosphere also by liquified gases. But it has proved especially advantageous according to the invention to provide as an embrittlement device, a coolant container which can be supplied with a low-temperature medium, preferably liquid nitrogen. A container which is suitable is placed in a mounting frame or housing and is designed so that it can receive at least one upright tire approximately up to about ⅓ of its diameter.

With a coolant bath, an especially fast and efficient cooling of the tires still hot from the production process is achieved, which is essential in regard to short cycle times.

In principle, an especially advantageous device according to the invention results if in the mounting frame or housing, controllable gripping, conveying and driving devices are installed, which make possible the various movement sequences within the housing for conveying and processing the tires and allow the coolant bath to be permanently installed in the housing.

The permanent installation of the coolant bath, i.e., so that the coolant bath remains unmoved during the operation of the unit, avoids cycle time limitations from the coolant sloshing over with fast bath movements. This limitation in the design is compensated by skillfully arranged conveying elements providing suitable movement sequences.

In an especially advantageous variant of the invention, the strap used for breaking is placed in the coolant bath itself.

With this measure, a very efficient version of such a device is obtained, since embrittlement and breaking of the parts to be removed take place basically at the same time. Thus, because of very short processing times and very short conveying and processing movements, minimal cycle times are possible. Basically with this device variant, the simplicity of the breaking tool used proved an advantage since such straps can be placed in low-temperature baths without problems, in contrast with pneumatically held rollers and straps. But the arrangement of the breaking tool according to the invention can also be outside the coolant bath; so the embrittlement and removal process can take place simultaneously or successively in the conveying sequence.

In the case of the arrangement of the coolant bath, it is advantageous if the bottom of the coolant bath is designed as funnel-shaped and is provided with a lock chamber adjacent to the funnel shape, so that from time to time the parts broken off from the tires can be removed from the coolant container with a discharge operation.

The strap used for breaking is advantageously installed with a holding device. Especially suitable is a rectangular frame enclosing the strap, in which the strap is fastened on two opposite frame posts and the remaining two posts are adjustable in length.

With this holding device the strap can be positioned in the assembly with the correct sag, so that it is adapted to the tire contours that occur.

Further, it is advantageous if the strap used for breaking is optionally elastically installed within its holding device.

As a result, on the one hand, an increased adaptability of the device to different tire contours and diameters is achieved, while, on the other hand, the contact pressure of the breaking tool on the tires is favorably regulated.

In another embodiment of the invention, varied with respect to another aspect, a housing is provided, which is substantially closed, and in the vicinity of the intake spot of the tires into the housing, a discharge pipe is connected to the housing by which gas is suctioned from the housing thereby providing a gas stream countercurrent to the tire feed in the housing interior space.

As a result, a precooling of the tires generally still heated from the production process before the actual cooling is achieved by volatilized liquid gas. This leads to a lower entry temperature into the cooling device, thus providing faster and altogether more economical cooling of the tires to be processed.

BRIEF DESCRIPTION OF THE DRAWINGS

A preferred embodiment of a device according to the invention is explained below by the diagrammatic drawings.

There are shown in.

DETAILED DESCRIPTION OF THE DRAWINGS

Figure 1:
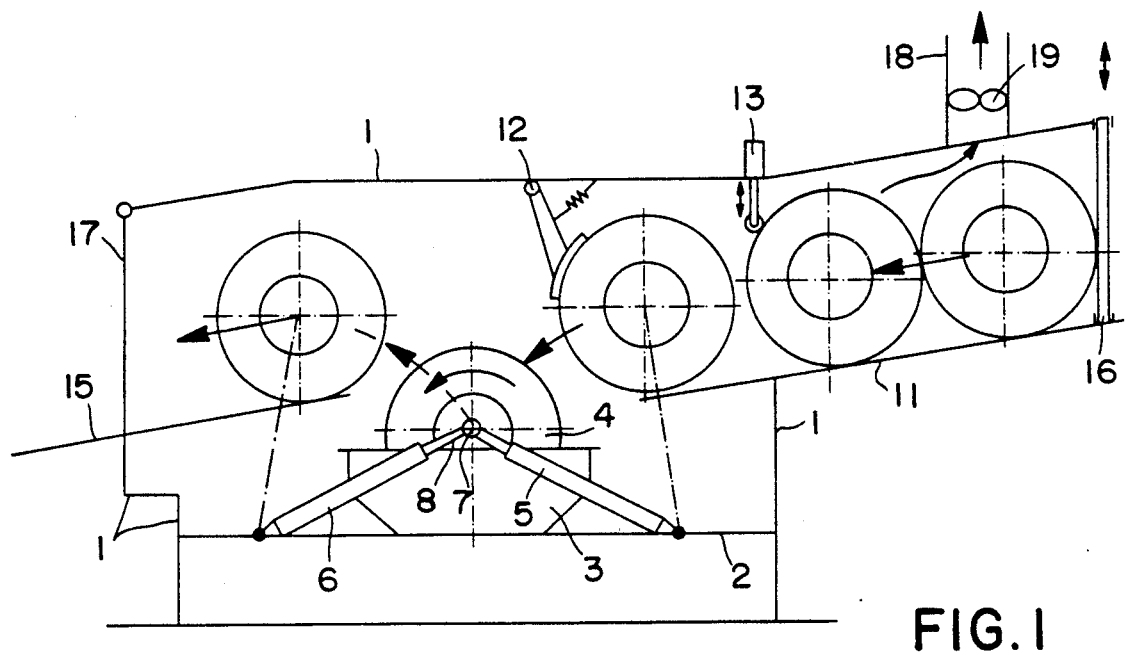
FIG. 1, a diagrammatic longitudinal section through a device according to the invention.

In FIG. 1, a housing 1 for the trimming device according to the invention is shown. A container 3 for the coolant serves as the enbrittlement device and is permanently installed in the center of the housing on a base plate 2 within the housing. In vertical positioning, immersed to about ¼ in the coolant bath, a tire 4 is held by pneumatic cylinders 5, 6 as well as two other pneumatic cylinders, operating parallel, not shown in the drawing, with chucks 8 by a carrying axle 7 supported on the end points of the pneumatic cylinders. Other unprocessed tires are fed up to a point, defined by a stop 12, by an inclined plane 11 to the holding device comprising pneumatic cylinders 5 and 6, chucks 8 and axle 7. The isolation and optional size measurement of the tires "to flow in" is achieved by another stop 13 mounted ahead of stop 12. Another inclined plane 15, which is used for conveying away the processed tires, lies opposite inclined feed plane 11. If a tire is completely processed, it is lifted by extension of pneumatic cylinder 5, while cylinder 6 remains rigid, to conveying plane 15, there it is released from the holding and drive device, i.e., holding chuck 8, and then, because of the inclined arrangement of plane 15, leaves the unit, and, of course, just as with feed plane 11, still other, not represented, lateral guide devices are present. Shown housing 1 is basically closed, which is achieved at the input side by a cyclically opening and closing sliding door 16 and, on the output side, by a flap 17. Adjacent to input sliding door 16 in the ceiling area of the housing is placed a discharge pipe 18, in which a fan 19 is housed. Thus with a running fan in the housing, a gas stream is produced in the entry direction, which provides a precooling of the incoming tires.

After the deposit of a completely processed tire, pneumatic cylinder 6 is extended, as a result of which the double cylinder arrangement is swung to feed plane 11, while at the same time cylinder 5 is suitably retracted, to receive a new tire from feed plane 11. Then, overcoming the counterforce from stop 12, the tire, clamped and centered with chucks 8 by appropriate control of cylinders 5 and 6, is suitably immersed in coolant bath 3. In the embodiment shown, the embrittlement and separation of the undesirable projecting parts from the tire to be processed takes place directly in the coolant bath, and a wire mesh belt known from conveyor technology is used as a breaking tool. The wire mesh belt is installed in the coolant bath itself.

The wire mesh belt in this embodiment has a mesh size of 6.35 mm, a diameter of wire of 1.2 mm, and is made of high alloy (Cr-Ni) steel. The belt is manufactured by "Jonge Poering Vercoop BV".

Figure 2:
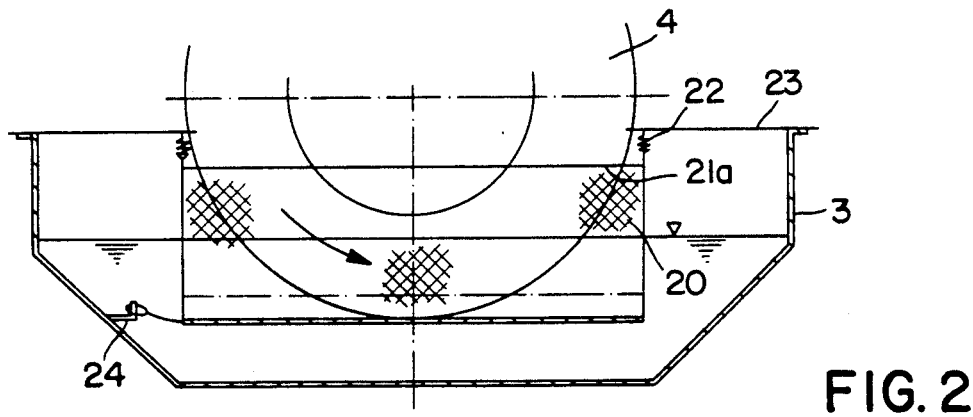
FIG. 2, a detailed partial view from FIG. 1 in section, which shows the coolant bath and the wire mesh belt placed in it.
Figure 3:
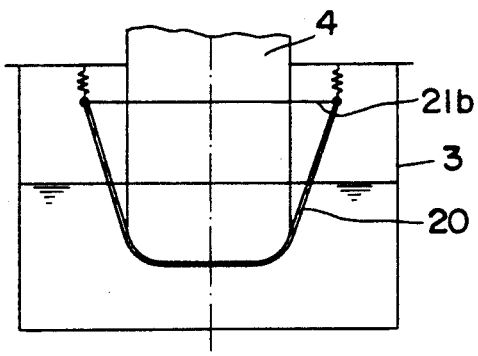
FIG. 3, a front view of the coolant bath in section.

An installation of a wire mesh belt 20 in coolant container 3 is shown in detail in FIGS. 2 and 3. Wire mesh belt 20 is fastened to a horizontally suspended rectangular frame with visible frame posts 21a, 21b. The frame itself hangs on its joints with springs on a cover plate 23 resting on the coolant container. Cover plate 23 has a cutout which is sufficient for introduction of a vertically oriented tire into the coolant bath. Another stop 24 for the wire mesh belt at appropriate level, for example in the form of a hook with the associated loop, is placed in coolant bath 3. It is used for lateral stabilization of the wire mesh belt, on which forces pointing especially in the lateral direction act even in operation.

With the device shown and described, there results in the performance of the processing movement, i.e., in the rotation of tire 4, a fast separation—covering all essential surfaces—of projecting parts from tire 4, as well as a very fast and economical operation.

The entire disclosures of all applications, patents and publications, cited above, and of the corresponding application, Federal Republic of Germany P 40 01

213.1, filed Jan. 17, 1990, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A device for removing projecting parts from tires and similar workpieces of different sizes, without any order, by embrittlement and breaking of the parts, which comprises:

a housing that contains an embrittlement device, a breaking tool, means for isolating gripping and conveying tires within said housing and means for providing processing movement of the tires within said housing, wherein the breaking tool comprises a ribbed flexible strap comprising connected individual members or a wire mesh suspended in a mounting frame so that cold-embrittled tires can be positioned on the strap with the strap resting on the profile of the cold-embrittled tire so as to remove projecting parts with the processing movement of the supported tire.

2. A device according to claim 1, wherein the embrittlement device is a coolant container which can be supplied with a low-temperature medium.

3. A device according to claim 2, wherein the coolant container is adapted to receive at least one upright tire approximately to about ⅓ of its diameter.

4. A device according to claim 2, wherein controllable pnematic cylinders with chucks that support a carrying axle comprise the means for gripping and conveying tires within said housing and the coolant container is permanently installed in said housing.

5. A device according to claim 2, wherein the ribbed flexible strap is placed in the coolant container.

6. A device according to claim 5, wherein the bottom of said coolant container is funnel-shaped and contains a lock chamber adjacent to the funnel shape.

7. A device according to claim 2, wherein the ribbed flexible strap is placed outside of the coolant container.

8. A device according to claim 1, wherein the mounting frame of the breaking tool is rectangular and encloses the ribbed flexible strap and said strap is fastened to two fixed posts on opposite ends of the frame and to two adjustable posts which are positioned along the length of the frame.

9. A device according to claim 1, wherein the ribbed flexible strap of the breaking tool is elastically fastened to the mounting frame.

10. A device according to claim 1, wherein the housing has a door for feeding tires from the ambient environment into said housing and a discharge pipe connected to the housing by which gas is suctioned from the housing in a direction countercurrent to the tire feed.

11. A device as in claim 3, wherein the low-temperature medium is liquid nitrogen.

12. A device as in claim 1, wherein the ribbed flexible strap is a belt used in conveyor technology.

13. In a process for removing projections from tires by embrittling the projections and mechanically removing resultant embrittled projection from the tire, the improvement which comprises removing the resultant embrittled projections by placing the tire in contact with a flexible wire mesh and moving the tire and said mesh with respect to one another.

14. In a process for removing projections from tires by embrittling the projections and mechanically removing resultant embrittled projections from the tire, the improvement comprising precooling the tire with vaporized coolant prior to embrittling the projections and removing the resultant embrittled projections by placing them in contact with a flexible wire mesh and moving the tire and said mesh with respect to one another.

* * * * *